United States Patent
Tamura et al.

(10) Patent No.: US 10,751,757 B2
(45) Date of Patent: Aug. 25, 2020

(54) VIBRATION GENERATION DEVICE AND ELECTRONIC APPARATUS

(71) Applicant: LENOVO (SINGAPORE) PTE. LTD., Singapore (SG)

(72) Inventors: Fumio Tamura, Yokohama (JP); Kimio Kumada, Yokohama (JP); Kazuyuki Kubota, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 95 days.

(21) Appl. No.: 16/242,871

(22) Filed: Jan. 8, 2019

(65) Prior Publication Data

US 2020/0130015 A1 Apr. 30, 2020

(30) Foreign Application Priority Data

Oct. 31, 2018 (JP) ................................. 2018-205949

(51) Int. Cl.
*B06B 1/14* (2006.01)
*G06F 3/041* (2006.01)
*F03G 7/06* (2006.01)

(52) U.S. Cl.
CPC ................ *B06B 1/14* (2013.01); *F03G 7/065* (2013.01); *G06F 3/0414* (2013.01)

(58) Field of Classification Search
CPC .......... B06B 1/14; G06F 3/0414; F03G 7/065
USPC ................................................... 310/306, 81
See application file for complete search history.

(56) References Cited

U.S. PATENT DOCUMENTS

| 2014/0306914 | A1* | 10/2014 | Kagayama | G06F 3/03547 |
| | | | | 345/173 |
| 2015/0369222 | A1* | 12/2015 | Fujii | F03G 7/065 |
| | | | | 60/527 |
| 2016/0102656 | A1* | 4/2016 | Fujii | F03G 7/065 |
| | | | | 310/306 |
| 2016/0186730 | A1* | 6/2016 | Watanabe | G06F 3/0416 |
| | | | | 345/173 |
| 2016/0259414 | A1* | 9/2016 | Fujii | G06F 3/016 |
| 2017/0284379 | A1* | 10/2017 | Krumpelman | G06F 3/016 |
| 2017/0344117 | A1* | 11/2017 | Yamazaki | G06F 3/023 |

(Continued)

FOREIGN PATENT DOCUMENTS

| JP | 2016-162328 A | 9/2016 |
| JP | 2016162328 A | 9/2016 |
| WO | 2013099743 A1 | 7/2013 |

*Primary Examiner* — Tulsidas C Patel
*Assistant Examiner* — Ahmed Elnakib
(74) *Attorney, Agent, or Firm* — Shimokaji IP (57) ABSTRACT

A vibration generation device is provided with a housing, a vibration target component provided to be movable relatively to the housing, an actuator which has a metal base portion, a metal movable portion, a beltlike shape memory alloy disposed between the base portion and the movable portion and in which, when the shape memory alloy receives current application to be changed so that the outer shape becomes small, the movable portion is pushed out in one direction of separating from the base portion in a state where the base portion abuts on a first wall surface of the housing, a resin holder component fixed to the vibration target component and abutting on a pushing surface facing the one direction of the movable portion, and an elastic member elastically energizing the movable portion in a direction opposite to the one direction.

7 Claims, 7 Drawing Sheets

(56) References Cited

U.S. PATENT DOCUMENTS

2018/0284893 A1* 10/2018 Shimizu ................ G06F 1/1637
2019/0377413 A1* 12/2019 Tamura ............... G06F 3/03547
2020/0130015 A1*  4/2020 Tamura ..................... B06B 1/14

* cited by examiner

VIBRATION GENERATION DEVICE AND ELECTRONIC APPARATUS

FIELD OF THE INVENTION

The present invention relates to a vibration generation device and an electronic apparatus provided with the vibration generation device.

BACKGROUND OF THE INVENTION

In electronic apparatuses, such as a Laptop PC and a tablet PC, a reduction in thickness has been strongly demanded. Therefore, input operation portions, such as a touchpad which can be input by clicking and a push button, have been demanded to eliminate a mechanical up and down movement thereof. Then, the electronic apparatus of this type has been mounted with a feedback technology (HAPTICS technology) of transmitting a click feeling to a user without the mechanical up and down movement by driving an actuator according to a touch input operation of a user in some cases. For example, Japanese Patent No. 5950139 discloses a configuration of using an actuator containing a shape memory alloy (SIA: Shape memory alloy Impact Actuator) as a vibration generation device of a touch panel.

SUMMARY OF THE INVENTION

In the actuator containing a shape memory alloy described above, a member to be driven by the shape memory alloy is usually formed of metal in order to secure the heat dissipation performance of the shape memory alloy and enable repeated current application to the shape memory alloy. Meanwhile, this member is fixed to a vibration target component, such as a touchpad, and therefore the member and the vibration target component need to be insulated. When the insulation is insufficient, the current application to the shape memory alloy causes a short circuit, so that the device causes a failure. However, there is no consideration for the insulation of this portion in Japanese Patent No. 5950139 described above.

The present invention has been made in view of the problems of the conventional technology described above. It is an object of the present invention to provide a vibration generation device capable of preventing the occurrence of a failure and an electronic apparatus provided with the vibration generation device.

A vibration generation device according to a first aspect of the present invention is provided with a housing, a vibration target component provided to be movable relative to the housing, an actuator which has a metal base portion, a metal movable portion, a belt-like shape memory alloy disposed between the base portion and the movable portion and in which, when the shape memory alloy receives current application to be changed so that the outer shape becomes small, the movable portion is pushed out in one direction of separating from the base portion in a state where the base portion abuts on a first wall surface of the housing, a resin holder component fixed to the vibration target component and abutting on a pushing surface facing the one direction of the movable portion, and an elastic member elastically energizing the movable portion in a direction opposite to the one direction.

According to such a configuration, the holder component coupled to the metal movable portion configuring the actuator containing the shape memory alloy is configured by a resin material. Therefore, when a current is applied to the shape memory alloy, a short circuit through the holder component does not occur, so that the occurrence of a failure in the vibration generation device and an electronic apparatus in which the vibration generation device is mounted can be prevented.

A configuration may be acceptable in which the holder component, the vibration target component, and the elastic member are fixed using a first screw. Thus, the positioning of the actuator and the elastic member can be performed with ease and with high accuracy in assembling the vibration generation device.

A configuration may be acceptable in which the elastic member is formed of metal and the elastic member and the movable portion are insulated by the holder component. Thus, the occurrence of a short circuit from the movable portion to the housing through the elastic member during the current application to the shape memory alloy can be prevented. Moreover, the holder component formed of resin having impact transmission ability lower than that of metal is supported by the metal elastic member having rigidity. Thus, although the resin holder component is used, the vibration from the actuator can be more efficiently transmitted to the vibration target component.

A configuration may be acceptable in which the movable portion is fixed to the holder component using second screws individually provided in both end portions with the pushing surface interposed therebetween. Thus, the pushing surface of the movable portion can be certainly pressed against the holder component, and thus the vibration of the actuator can be more certainly transmitted to the vibration target component.

A configuration may be acceptable in which the housing has a placement surface on which the vibration target component is placed in a movable state and an opening portion formed in a part of the placement surface, the holder component is fixed to the opposite surface to the placement surface of the vibration target component through the opening portion, and the holder component and the actuator are provided to be movable inside the opening portion.

A configuration may be acceptable in which the housing has the first wall surface provided in a first edge portion of the opening portion and on which the base portion abuts and a second wall surface provided in a second edge portion facing the first edge portion of the opening portion and on which the elastic member abuts.

A configuration may be acceptable in which the actuator, the holder component, and the elastic member are provided at positions closer to one side from a center portion of the vibration target component when the vibration direction of the vibration target component is used as a reference. Thus, even when the actuator, the holder component, and the elastic member are provided projecting from one surface of the vibration target component, the actuator and the like are intensively arranged on only one side on the one surface side of the vibration target component. As a result, a large space can be secured on the other side on the one surface side of the vibration target component in which the actuator is not disposed, and the other components can be disposed in this space.

A vibration generation device according to a second aspect of the present invention is provided with a housing, a vibration target component provided to be movable relatively to the housing, an actuator which has a base portion, a movable portion, a beltlike shape memory alloy disposed between the base portion and the movable portion and in which, when the shape memory alloy receives current application to be changed so that the outer shape becomes small, the movable portion is pushed out in one direction of separating from the base portion in a state where the base portion abuts on a wall surface of the housing, a holder component fixed to the vibration target component and abutting on a pushing surface facing the one direction of the movable portion, an elastic member elastically energizing the movable portion in a direction opposite to the one direction, and a screw fixing the holder component, the vibration target component, and the elastic member.

According to such a configuration, the positioning of the actuator and the elastic member can be performed with ease and with high accuracy in assembling the vibration generation device.

An electronic apparatus according to a third aspect of the present invention is provided with the vibration generation device of the configurations described above. The vibration target component may be configured by a touch operation portion which can be operated by touch or a display which can be operated by touch.

According to the above-described aspects of the present invention, the occurrence of a failure in the vibration generation device and an electronic apparatus mounted with the vibration generation device can be prevented.

DETAILED DESCRIPTION OF THE INVENTION

Hereinafter, a vibration generation device according to an aspect of the present invention is described in detail with reference to the attached drawings according to a preferable embodiment in which an electronic apparatus provided with the device is illustrated.

Figure 1:
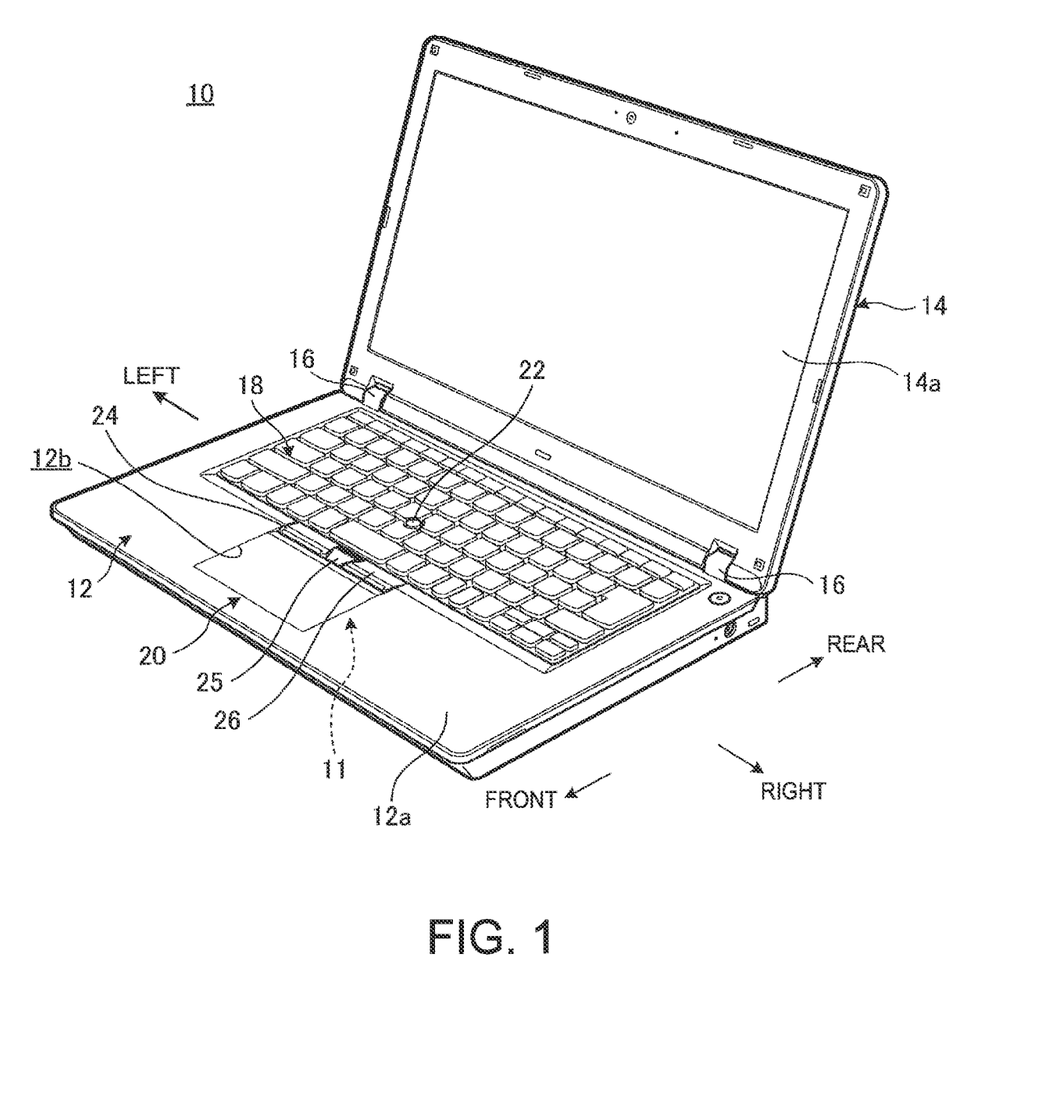
FIG. 1 is a perspective view of an electronic apparatus according to one embodiment of the present invention.

FIG. 1 is a perspective view of an electronic apparatus 10 according to one embodiment of the present invention. The electronic apparatus 10 is a Laptop PC in which a body chassis 12 and a display chassis 14 are rotatably coupled by hinges 16. In this embodiment, although the Laptop PC is illustrated as the electronic apparatus 10, the electronic apparatus 10 may be a tablet PC, a smartphone, or the like.

The body chassis 12 is a chassis of a box shape formed of resin or metal and contains various kinds of electronic components which are not illustrated, such as a substrate, an arithmetic processing unit, a hard disk drive, and a memory, thereinside. On an upper surface 12a of the body chassis 12, a keyboard 18 and a touch operation portion 20 are provided. Substantially at the center of the keyboard 18, a pointing stick 22 is provided. Between the keyboard 18 and the touch operation portion 20, three push buttons 24, 25, and 26 are provided. The display chassis 14 has a display 14a, such as a liquid crystal display, on the front surface of the box-shaped chassis formed of resin or metal.

The touch operation portion 20 and the pointing stick 22 are used for operating a cursor (mouse pointer) displayed on the display 14a and are input operation portions which can be operated as a substitute for a mouse. The touch operation portion 20 is configured as a clickable touchpad (clickpad) which allows a tracing operation of tracing the touch operation portion 20 with a fingertip or the like or a click operation of pressing the touch operation portion 20 with a fingertip or the like. The touch operation portion 20 is not provided with a mechanism for moving up and down in the click operation. Thus, the electronic apparatus 10 of this embodiment is mounted with a vibration generation device 11 generating vibration in the touch operation portion 20 when the touch input operation to the touch operation portion 20 is performed (see FIG. 2 and FIG. 3). The push buttons 24 to 26 function in cooperation with a cursor operation by the touch operation portion 20 or the pointing stick 22. The push buttons 24 to 26 are click operation buttons corresponding to a left button, a center button, and a right button, respectively, in a common mouse.

Hereinafter, the vibration generation device 11 and the touch operation portion 20 are described based on a use form in a state of being mounted in the electronic apparatus 10 illustrated in FIG. 1 as a reference while defining the front side as the front, the deep side as the rear, the thickness direction as top and bottom, and the width direction as right and left. These directions are defined for convenience of description. Therefore, the vertical direction and the right and left direction, for example, are also reversed in some cases depending on the arrangement and the installation attitude of the vibration generation device 11 mounted in a product.

Figure 2:
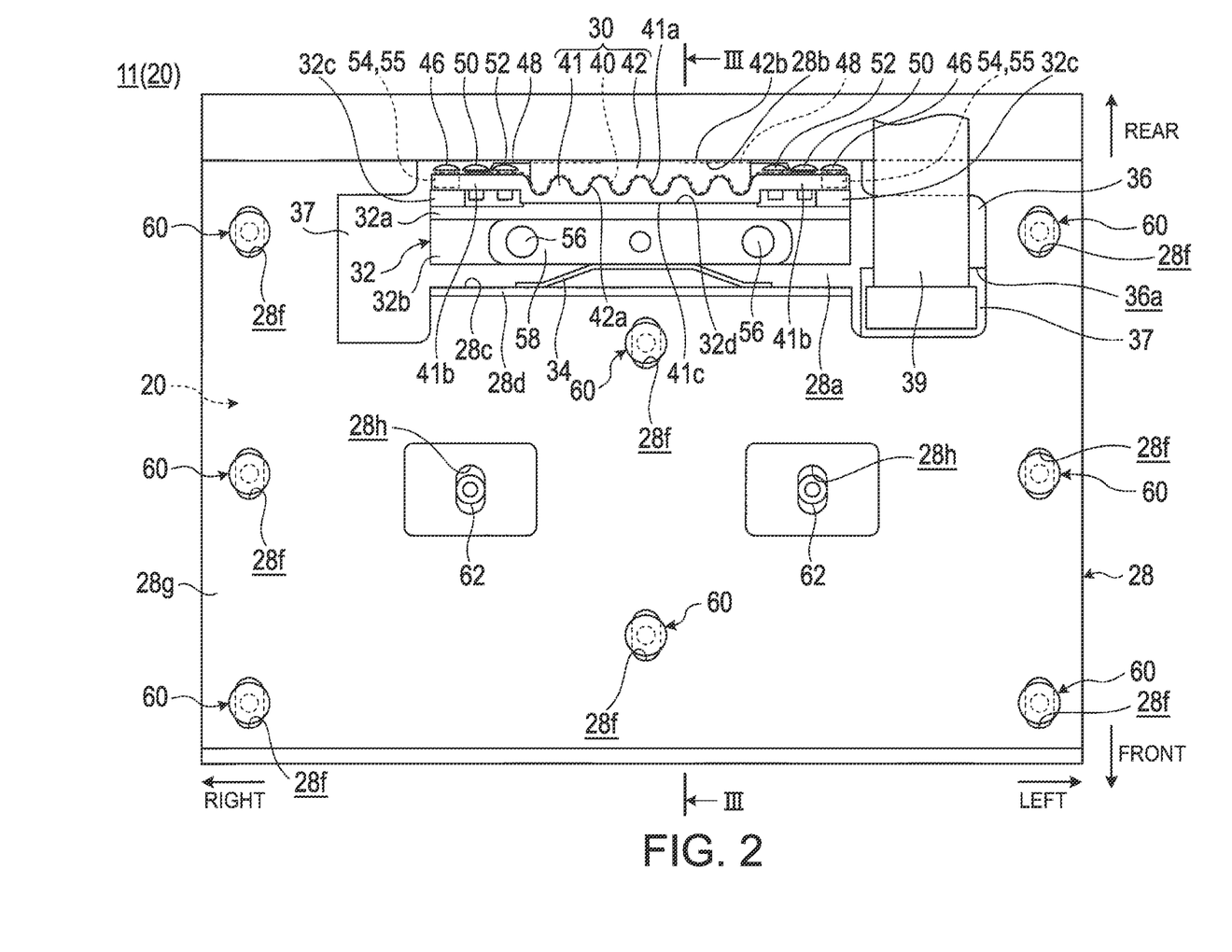
FIG. 2 is a bottom view schematically illustrating the configuration of a vibration generation device and a touch operation portion.
Figure 3:
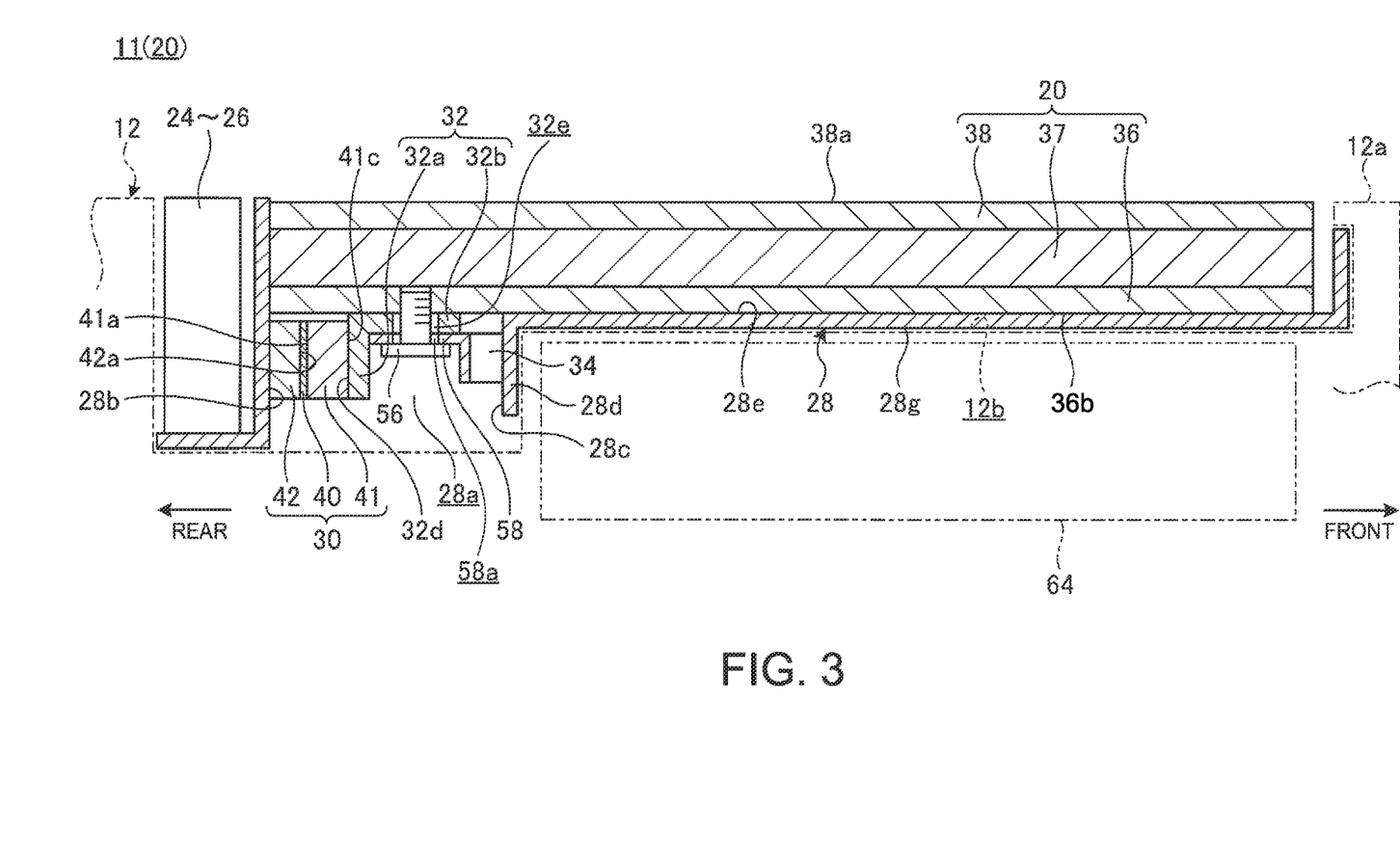
FIG. 3 is a cross-sectional view schematically illustrating the configuration along the III-III line in FIG. 2.
Figure 4:
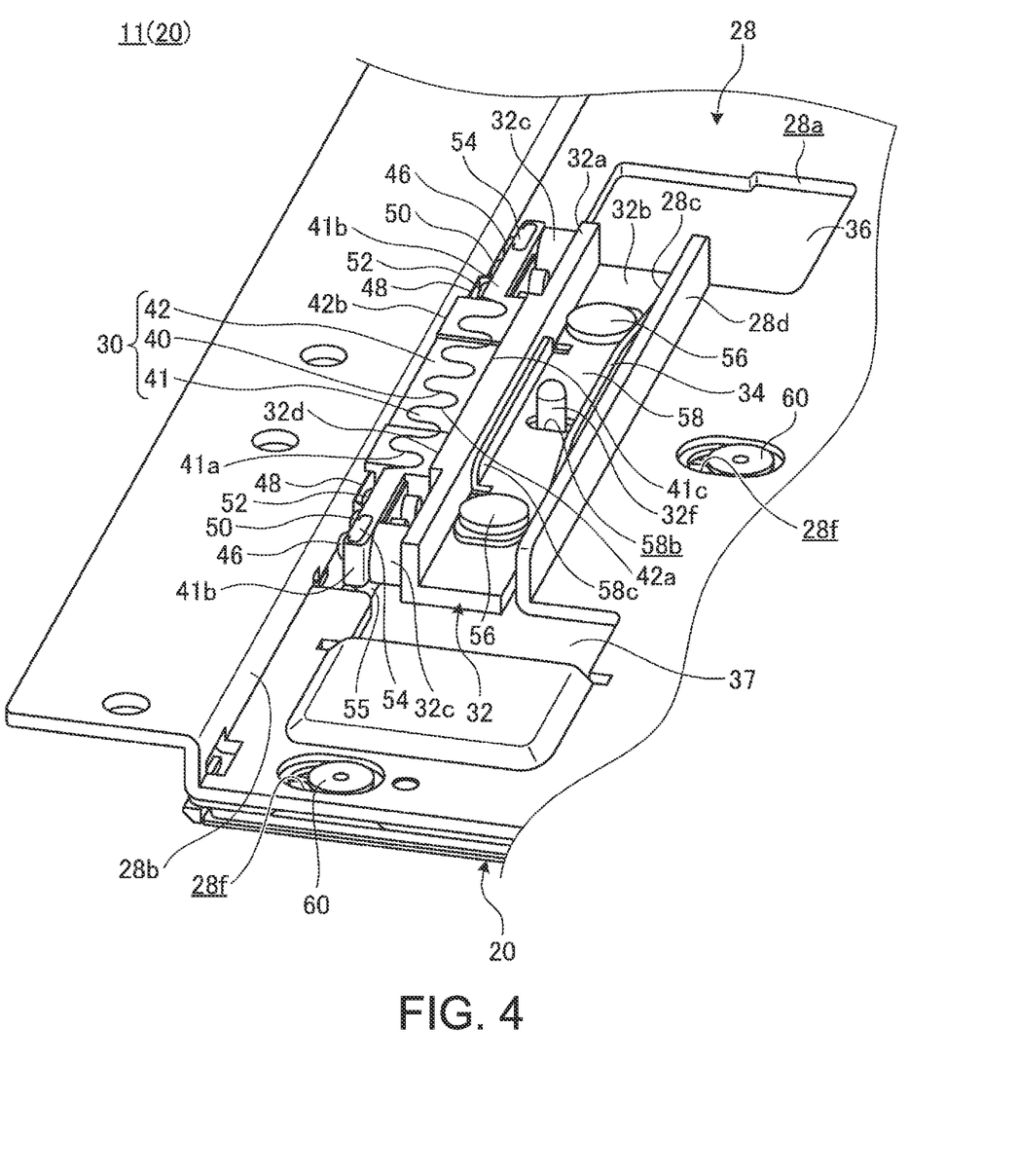
FIG. 4 is a perspective view in which the vibration generation device and a peripheral portion thereof are viewed from the bottom surface side.

FIG. 2 is a bottom view schematically illustrating the configuration of the vibration generation device 11 and the touch operation portion 20. FIG. 3 is a cross-sectional view schematically illustrating the configuration along the III-III line in FIG. 2. FIG. 4 is a perspective view in which the vibration generation device 11 and a peripheral portion thereof are viewed from the bottom surface side.

The vibration generation device 11 is a device vibrating the touch operation portion 20 which is the vibration target component. As illustrated in FIG. 2 to FIG. 4, the vibration generation device 11 is provided with a housing 28, an actuator 30, a holder component 32, and an elastic member 34.

The touch operation portion 20 is relatively movably supported on a placement surface 28e of the housing 28 which is a plate-like member. The touch operation portion 20 has a three-layer structure in which a base plate 36, a substrate 37, and a pad plate 38 are laminated in this order from the bottom toward the top, for example.

The base plate 36 is a plate-like member serving as a base plate of the touch operation portion 20. The base plate 36 is formed of a metal thin plate of aluminum, stainless steel, or the like and openings or raised portions are formed in several places. The base plate 36 is slidably placed on the placement surface 28e with an undersurface 36b thereof serving as an opposite surface to the placement surface 28e. The substrate 37 is a sensor laminated on the upper surface of the base plate 36 and detecting a touch input operation, such as the tracing operation or the click operation, to an input surface 38a of the pad plate 38. The substrate 37 is stuck to the upper surface of the base plate 36 with an adhesive, a double-sided tape, or the like. The substrate 37 is connected to a main substrate (mother board) in the body chassis 12 by wiring 39 passing through an opening portion 36a of the base plate 36 and an opening portion 28a of the housing 28. The pad plate 38 is laminated on the upper surface of the substrate 37 and the upper surface thereof serves as the input surface 38a receiving the touch input operation. The pad plate 38 is formed of a glass plate or a resin plate. The pad plate 38 is stuck to the upper surface of the substrate 37 with an adhesive, a double-sided tape, or the like.

The housing 28 is a bracket supporting the touch operation portion 20 and the vibration generation device 11 to the body chassis 12. The housing 28 is formed of a metal thin plate of aluminum, stainless steel, or the like and openings or raised portions are formed in several places. The housing 28 is fixed within a storage recessed portion 12b formed in the upper surface 12a of the body chassis 12 and exposes the touch operation portion 20 to the upper surface 12a (see FIG. 3). On a rear end portion of the housing 28, the push buttons 24 to 26 are supported. The housing 28 may be integrally molded with the body chassis 12.

As illustrated in FIG. 2, guide holes 28f and positioning holes 28h extending in the front and rear direction are formed in several places of the housing 28. A guide pin 60 is inserted into the guide hole 28f to be movable in the front and rear direction. A positioning pin 62 is inserted into the positioning hole 28h to be unmovable in the right and left direction and movable in the front and rear direction. The guide pins 60 and the positioning pins 62 are provided to project from the undersurface 36b of the base plate 36. Thus, the touch operation portion 20 is supported in a state where the movement in the front and rear direction is permitted and the movement in the right and left direction is restricted on the placement surface 28e of the housing 28.

The actuator 30 vibrates the touch operation portion 20 when the touch input operation is performed to the touch operation portion 20 to thereby give a click feeling to a user. The actuator 30 of this embodiment is controlled to generate vibration according to the click operation to the touch operation portion 20 and not to generate vibration to the tracing operation but may be controlled to generate vibration in the tracing operation. The actuator 30 is an actuator containing a shape memory alloy 40 (SIA: Shape memory alloy Impact Actuator).

As illustrated in FIG. 2 and FIG. 3, the actuator 30 has the shape memory alloy 40, a movable portion 41, and a base portion 42. The actuator 30 is supported on the undersurface side of the touch operation portion 20 through the holder component 32 and is disposed in the opening portion 28a of the housing 28. The actuator 30 has a small gap between the actuator 30 and the undersurface 36b of the base plate 36 (see FIG. 3). In the actuator 30, the movable portion 41 and the base portion 42 move relatively to each other due to the expansion and contraction of the shape memory alloy 40, whereby the actuator 30 generates vibration. The actuator 30 quickly vibrates the touch operation portion 20 at an acceleration of about 6 G, for example, and thus can give a certain click feeling to a user.

The movable portion 41 is a thick plate-like member formed of metal having high thermal conductivity, such as aluminum or copper. The movable portion 41 has a wave-like surface 41a formed by a wave-like curved surface extending in the right and left direction and flange-like support pieces 41b and 41b projecting to right and left from right and left end portions, respectively, of the wave-like surface 41a. An end portion of each support piece 41b is fastened to the holder component 32 using a metal screw 46.

The base portion 42 is a thick plate-like member formed of metal having high thermal conductivity, such as aluminum or copper. The base portion 42 has a wave-like surface 42a formed by a wave-like curved surface extending in the right and left direction. The wave-like surface 42a of the base portion 42 has a shape which can closely contact the wave-like surface 41a of the movable portion 41 and the shape memory alloy 40 is held therebetween. A rear surface 42b of the base portion 42 abuts on a rear end surface 28b of the opening portion 28a of the housing 28. In both right and left end portions of the rear surface 42b, recessed portions recessed to the front side are formed and one end of the plate spring 48 is disposed in each of the recessed portions. The plate spring 48 has a crank shape. The other end is fixed to the support piece 41b of the movable portion 41 using the metal screw 50. Each plate spring 48 holds the base portion 42 to the movable portion 41 and always energizes the base portion 42 to the movable portion 41 side to bring the wave-like surface 42a into pressure contact with the wave-like surface 41a with the shape memory alloy 40 interposed therebetween.

The shape memory alloy 40 is an alloy having a property of returning to the original shape when heated to a predetermined temperature or more and is connected to a driving power supply which is not illustrated. The shape memory alloy 40 is a thread-like or beltlike thin plate and is held between the wave-like surfaces 41a and 42a of the movable portion 41 and the base portion 42, respectively. In the shape memory alloy 40, each of right and left end portions projecting to the outside between the wave-like surfaces 41a and 42a is fixed to the support piece 41b of the movable portion 41 using a metal screw 52. To each of the support pieces 41b of the movable portion 41, a plate spring-like power supply terminal 54 is attached using the screw 46. The right and left power supply terminals 54 are electrically connected to the right and left end portions of the shape memory alloy 40. Each of the power supply terminals 54 passes through the opening portion 36a of the base plate 36 to be pressed against the power supply pad 55 on the substrate 37. Thus, the shape memory alloy 40 is electrically connected to a driving power supply which is not illustrated via the power supply pads 55 and the power supply terminals 54.

Figure 5A:
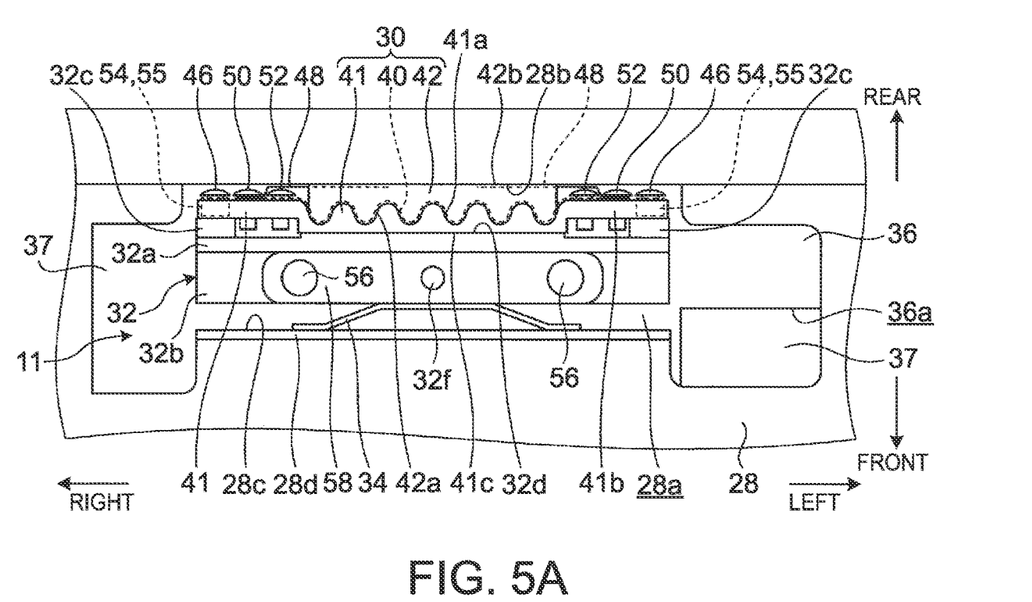
FIG. 5A is an enlarged bottom view of a principal portion schematically illustrating the configuration of the vibration generation device.
Figure 5B:
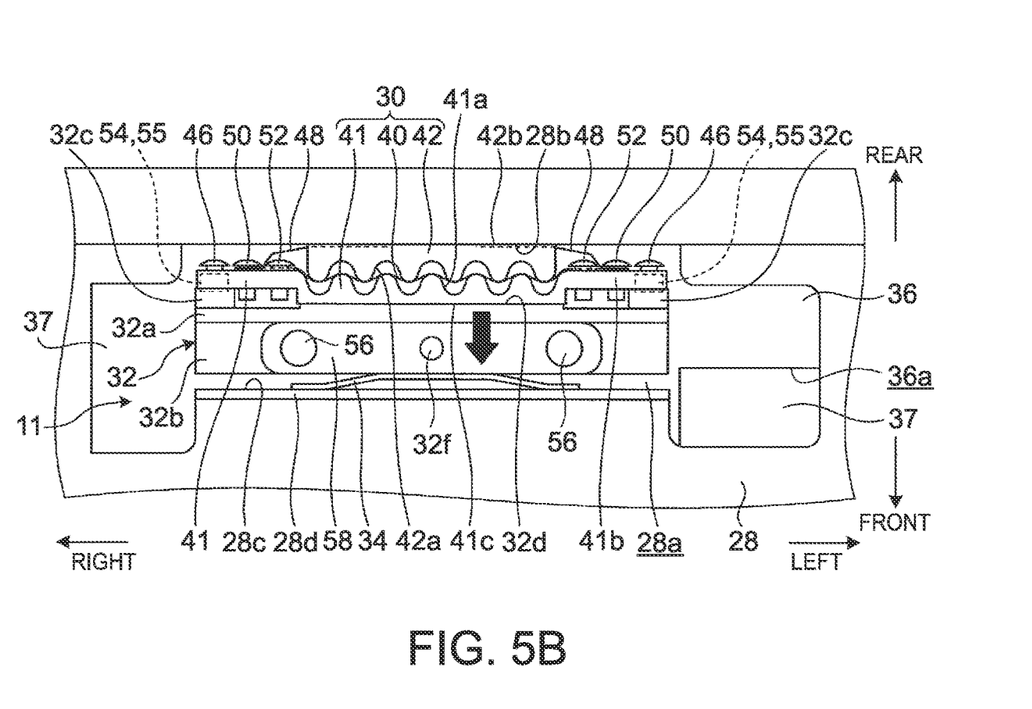
FIG. 5B is an enlarged bottom view of a principal portion schematically illustrating a state where an actuator is driven from the state illustrated in FIG. 5A.

The shape memory alloy 40 extends in a wave-like shape in the longitudinal direction to be brought into a wave-like shape along the wave-like surfaces 41a and 42a between the wave-like surfaces 41a and 42a when a current is not applied from the driving power supply (see FIG. 2 and FIG. 5A). The shape memory alloy 40 reaches a predetermined temperature or more by Joule heat during the current application from the driving power supply. Thus, the shape memory alloy 40 returns to the original shape in which the shape memory alloy 40 contracts in the right and left direction so that the amplitude of the waves decreases to push the wave-like surfaces 41a and 42a to open to thereby separate the movable portion 41 and the base portion 42 from each other (see FIG. 5B).

The holder component 32 is a resin component provided on the front side of the actuator 30. The holder component 32 is an L-shaped plate-like member having an abutting plate 32a raised upward and an attachment plate 32b extending forward on the front side of the abutting plate 32a.

The abutting plate 32a has bosses 32c projecting from the rear surfaces of right and left both end portions and an abutting surface 32d slightly bulged rearward from a center portion between the right and left bosses 32c. In each boss 32c, for example, a female screw by an insert nut is formed, and the top surface of the each boss 32c is disposed opposite to the front surface of each support piece 41b through a small gap. To each boss 32c, the screw 46 inserted into each support piece 41b is fastened, whereby the holder component 32 is coupled to the movable portion 41. The abutting surface 32d abuts on the pushing surface 41c of the movable portion 41 of the actuator 30.

The attachment plate 32b is fastened to the base plate 36 using one pair of right and left screws 56 and 56 in a state where the upper surface abuts on the undersurface 36b of the base plate 36. More specifically, the holder component 32 is coupled to the touch operation portion 20 and is simultaneously coupled to the movable portion 41. Onto the undersurface of the attachment plate 32b, an attachment portion 58 of the elastic member 34 is laminated and fixed. The attachment portion 58 is jointly fastened by the screws 56 to the base plate 36 together with the attachment plate 32b (see FIG. 3). The screw 56 is inserted into an attachment hole 32e of the attachment plate 32b and an attachment hole 58a of the attachment portion 58. The attachment holes 32e and 58a are long holes which are longer at least in the front and rear direction than a shaft portion or a screw portion of the screw 56 and enable position adjustment of the attachment plate 32b and the attachment portion 58 in fastening the screws 56 (see FIG. 3).

The elastic member 34 is a metal plate spring formed in a substantially V shape as viewed in plan and is formed to be bent downward from the rear end of the attachment portion 58 fixed to the undersurface of the attachment plate 32b. In the elastic member 34, right and left tip portions of the V shape projecting forward individually abut on a front end surface 28c of the opening portion 28a of the housing 28. The elastic member 34 always energizes the movable portion 41 rearward through the holder component 32. In the case of this embodiment, the front end surface 28c is formed on the rear surface of a projection plate 28d bent downward from a front tip portion of the opening portion 28a. At the center of the attachment portion 58, a positioning hole 58b, into which a positioning pin 32f projecting from the attachment plate 32b of the holder component 32 is inserted, is formed. In a rear end portion of the attachment portion 58, a stopper piece 58c abutting on the abutting plate 32a of the holder component 32 is provided (see FIG. 4). The elastic member 34 may be configured by a coil spring or the like provided between the front surface of the abutting plate 32a of the holder component 32 and the front end surface 28c of the housing 28, for example.

In such a vibration generation device 11, the holder component 32 is formed of a resin material as described above. Therefore, the holder component 32 is insulated against the metal movable portion 41 in which the power supply terminals 54 are provided. Therefore, the holder component 32 does not cause a short circuit between the right and left support pieces 41b and 41b to which the power supply terminals 54 are fixed during the current application to the shape memory alloy 40. The metal movable portion 41 and the elastic member 34 are also insulated by the holder component 32. Therefore, a short circuit is not caused from the movable portion 41 to the housing 28 through the elastic member 34 during the current application to the shape memory alloy 40.

Next, an operation of the vibration generation device in performing a touch input operation to the touch operation portion 20 is described.

Figure 6A:
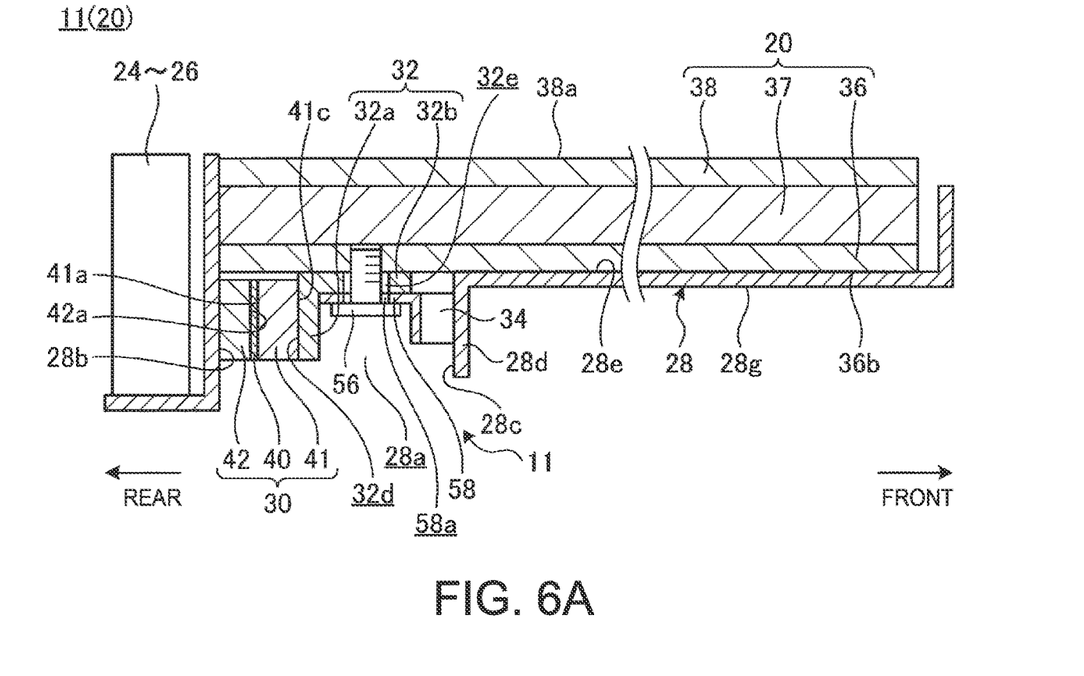
FIG. 6A is a side cross-sectional view schematically illustrating the configuration of the vibration generation device.

In a state where the touch input operation to the touch operation portion 20 is not performed, the shape memory alloy 40 is in a non-current application state. In this state, the actuator 30 is located at the initial position where the shape memory alloy 40 extends in a wave-like state and the wave-like surface 41a of the movable portion 41 and the wave-like surface 42a of the base portion 42 are closest to each other with the shape memory alloy 40 interposed therebetween as illustrated in FIG. 2, FIG. 5A, and FIG. 6A. In this initial position, the movable portion 41 is located at a position where the movable portion 41 moves to the deepest side to the housing 28 by the energization force of the elastic member 34. Therefore, the touch operation portion 20 is also located at a position where the touch operation portion 20 moves to the deepest side on the placement surface 28e of the housing 28 (see FIG. 3 and FIG. 6A).

Figure 6B:
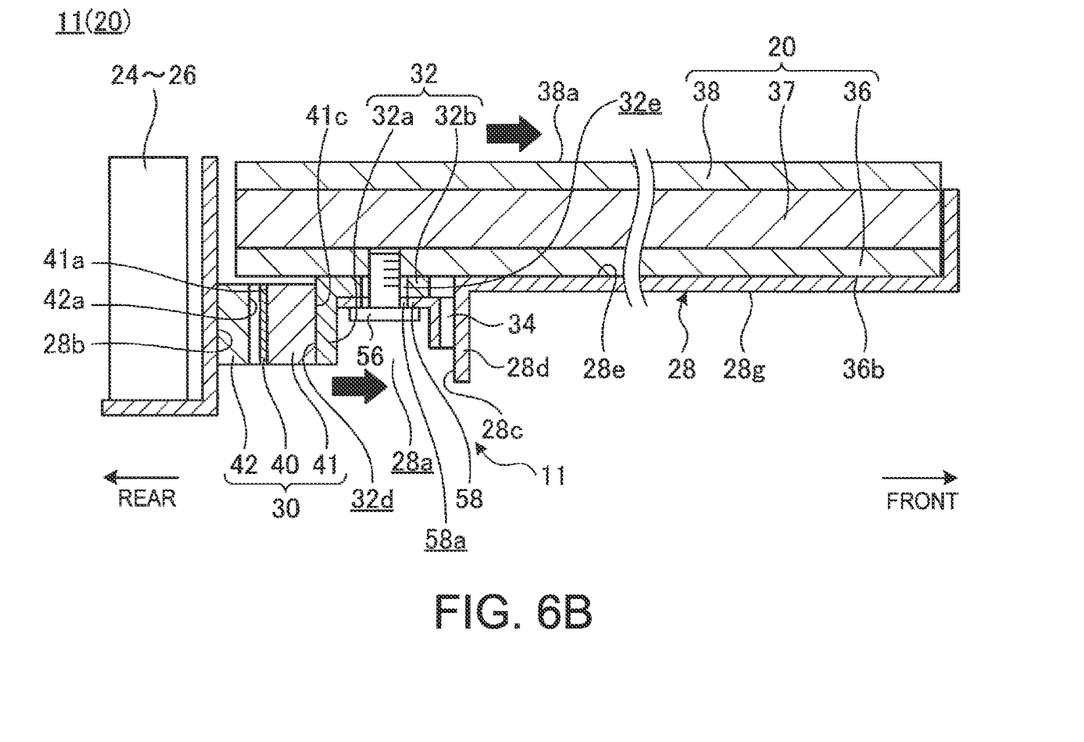
FIG. 6B is a side cross-sectional view schematically illustrating a state where the actuator is driven from the state illustrated in FIG. 6A.

When a user performs a click operation to the input surface 38a by a fingertip from this state, for example, this click operation is detected by the substrate 37, so that a current is applied to the shape memory alloy 40. As a result, the shape memory alloy 40 reaching a predetermined temperature or more returns to the original shape of contracting in the right and left direction, and then is changed so that the outer shape becomes small to push the wave-like surfaces 41a and 42a to open to thereby separate the movable portion 41 and the base portion 42 from each other (see FIG. 5B and FIG. 6B). Herein, in the base portion 42, the rear surface 42b thereof abuts on the rear end surface 28b of the housing 28. Therefore, the position in the front and rear direction of the base portion 42 is not changed and the movable portion 41 is relatively pushed out forward within the opening portion 28a against the energization force of the elastic member 34. Subsequently, the movable portion 41 is pushed back rearward by the energization force of the elastic member 34 abutting on the front end surface 28c this time.

In the case of this embodiment, intermittent current application is performed at a predetermined frequency to the shape memory alloy 40 based on operation time, operation pressure, and the like of the click operation to the input surface 38a, for example, in the actuator 30. As a result, the movable portion 41 vibrates in the front and rear direction within the opening portion 28a by the push-out force by the shape memory alloy 40 and the push-back force by the elastic member 34. Thus, the touch operation portion 20 vibrates in the front and rear direction together with the movable portion 41, so that a user can obtain a predetermined click feeling.

At this time, the holder component 32 coupled to the metal movable portion 41 using the screws 46 is configured by a resin material in the vibration generation device 11 of this embodiment. Therefore, when a current is applied to the shape memory alloy 40, the right and left support pieces 41b and 41b supporting the right and left end portions of the shape memory alloy 40 do not cause a short circuit through the holder component 32, and thus the occurrence of a failure in the vibration generation device 11 or the electronic apparatus 10 can be prevented.

The vibration generation device 11 is required to be able to certainly transmit the vibration of the actuator 30 to the touch operation portion 20. Therefore, it is required in the base portion 42 that the rear surface 42b is stably pressed against the rear end surface 28b of the housing 28 by the energization force of the elastic member 34 in a certainly surface contact state without causing partial contact or the like. Then, the vibration generation device 11 of this embodiment is configured so that the elastic member 34 is jointly fastened with the screws 56 fixing the holder component 32 to the touch operation portion 20. Therefore, the vibration generation device 11 can easily perform the positioning of the actuator 30 and the elastic member 34 between the rear end surface 28b and the front end surface 28c of the housing 28 in the assembly thereof. More specifically, the vibration generation device 11 can press the rear surface 42b of the base portion 42 against the rear end surface 28b utilizing the energization force of the elastic member 34, for example, and then fasten the screws in the state. Thus, the actuator 30 can be easily positioned and supported and the rear surface 42b can eliminate a gap between the rear surface 42b and the rear end surfaces 28b. The vibration generation device 11 may be configured so that the elastic member 34 is fixed to the holder component 32 with a screw different from the screws 56 or the elastic member 34 is directly fixed to the touch operation portion 20, for example, instead of jointly fastening the elastic member 34 with the holder component 32.

The movable portion 41 has the support piece 41b disposed to be somewhat offset rearward relative to the pushing surface 41c on both right and left sides of the pushing surface 41c abutting on the abutting surface 32d of the holder component 32. The right and left support pieces 41b and 41b are individually fixed to both right and left end portions of the abutting plate 32a of the holder component 32 using the screws 46. Therefore, the pushing surface 41c of the movable portion 41 and the abutting surface 32d of the holder component 32 can be certainly pressed against each other between the right and left screws 46 and 46. As a result, the vibration generation device 11 can certainly transmit the vibration of the actuator 30 by the touch operation portion 20. Moreover, the holder component 32 is formed of a resin material, and therefore the abutting surface 32d is softer than the metal pushing surface 41c. Therefore, when the abutting surface 32d is pressed against the pushing surface 41c, the pushing surface 41c is not deformed and only the abutting surface 32d is deformed. Therefore, no gap is formed between both the surfaces 41c and 32d and the occurrence of a situation where the movable portion 41 is deformed, so that the actuator 30 cannot generate desired vibration can also be prevented.

In the vibration generation device 11, the actuator 30, the holder component 32, and the elastic member 34 are located at positions closer to the rear side from a center portion of the touch operation portion 20 when the vibration direction (front and rear direction) of the touch operation portion 20 is used as a reference. Therefore, as illustrated in FIG. 2, the actuator 30 greatly projecting downward from the undersurface 36b of the touch operation portion 20 is intensively arranged only on the rear end side. As a result, a large space is secured under a front portion of the touch operation portion 20 where the actuator 30 is not disposed. Therefore, a battery device 64 (see FIG. 3) of the electronic apparatus 10 can be disposed in this space, for example, and the generation of a dead space can be reduced.

The vibration generation device 11 is provided with the metal elastic member 34 on the rear surface of the abutting plate 32a of the resin holder component 32 through the stopper piece 58c formed of metal. More specifically, the vibration generation device 11 supports the holder component 32 formed of resin having impact transmission ability lower than that of metal by the metal elastic member having rigidity. Thus, although the resin holder component 32 is used, the vibration from the actuator 30 can be more efficiently transmitted to the touch operation portion 20.

Figure 7:
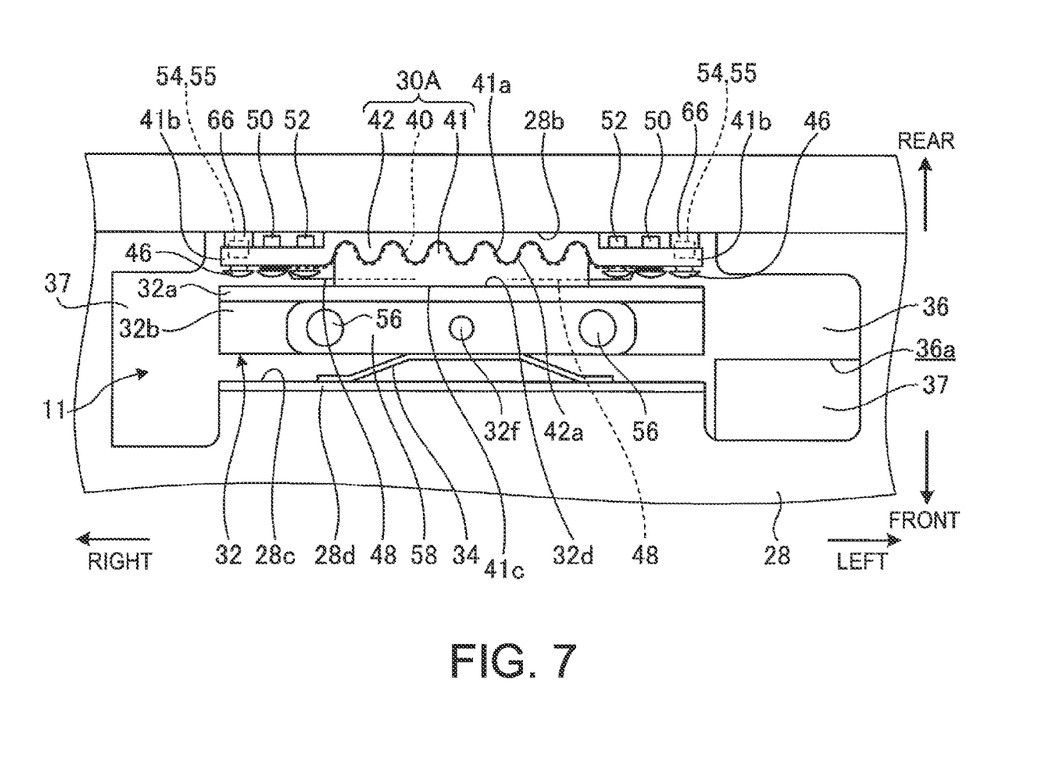
FIG. 7 is an enlarged bottom view of a principal portion schematically illustrating the configuration of a vibration generation device using an actuator according to a modification.

FIG. 7 is an enlarged bottom view of a principal portion schematically illustrating the configuration of the vibration generation device 11 using an actuator 30A according to a modification.

The actuator 30 described above has the configuration in which the power supply terminals 54 are provided in the movable portion 41 as illustrated in FIG. 2 and FIG. 5A. On the other hand, the actuator 30A illustrated in FIG. 7 has a configuration in which the actuator 30 illustrated in FIG. 5A is reversed in the front and rear direction. In this actuator 30A, the support pieces 41b are eliminated from the movable portion 41 and the support pieces 41b are provided in the base portion 42 instead of the movable portion 41 and the power supply terminals 54 are fixed. In the actuator 30A, cylindrical bosses 66 are provided between the right and left support pieces 41b of the base portion 42 and the rear end surface 28b of the housing 28 and the base portion 42 and the housing 28 are fixed with the screws 46 through the bosses 66. Also in the movable portion 41 of the actuator 30A, the pushing surface 41c abuts on the abutting surface 32d of the holder component 32. Therefore, also in the vibration generation device 11 using such an actuator 30A, when the shape memory alloy 40 returns to the original shape during current application, the movable portion 41 moves forward against the energization force of the elastic member 34, and then vibrates in the front and rear direction within the opening portion 28a.

It is a matter of course that the present invention is not limited to the embodiments described above and can be freely altered without deviating from the scope of an aspect of the present invention.

In the description above, although the click pad is illustrated as the touch operation portion 20, the touch operation portion 20 may be applied to those to which a touch input operation is performed other than the click pad, e.g., a touch panel of the display 14a, or may be applied to the push buttons 24 to 26 or the keyboard 18.

The description above illustrates the configuration in which the actuator 30 (30A) generates vibration in the front and rear direction to vibrate the touch operation portion 20 in the front and rear direction. However, the actuator 30 (30A) may be configured to vibrate the touch operation portion 20 in the right and left direction or in the front and rear and right and left directions.

The invention claimed is:

1. A vibration generation device comprising:
   a housing;
   a vibration target component that is movable relative to the housing;
   an actuator having a metal base portion, a metal movable portion, and a shape memory alloy in a belt shape and disposed between the base portion and the movable portion and wherein, when the shape memory alloy receives electrical current that reduces a size of an outer shape, the movable portion is pushed out in one direction of separation from the base portion when the base portion abuts a first wall surface of the housing;

a resin holder component fixed to the vibration target component and abutting a pushing surface facing the one direction of the movable portion;

an elastic member configured to elastically energize the movable portion in a direction opposite to the one direction;

the holder component, the vibration target component, and the elastic member are fixed using a first screw;

the elastic member is made of metal, and the elastic member and the movable portion are insulated by the holder component.

2. The vibration generation device according to claim 1, wherein:

the actuator, the holder component, and the elastic member are closer to one side from a center portion of the vibration target component when a vibration direction of the vibration target component is used as a reference.

3. A vibration generation device comprising:

a housing;

a vibration target component that is movable relative to the housing;

an actuator having a metal base portion, a metal movable portion, and a shape memory alloy in a belt shape and disposed between the base portion and the movable portion and wherein, when the shape memory alloy receives electrical current that reduces a size of an outer shape, the movable portion is pushed out in one direction of separation from the base portion when the base portion abuts a first wall surface of the housing;

a resin holder component fixed to the vibration target component and abutting a pushing surface facing the one direction of the movable portion; and an elastic member configured to elastically energize the movable portion in a direction opposite to the one direction; and the movable portion is fixed to the holder component by second screws in both end portions with the pushing surface interposed between both end portions.

4. The vibration generation device according to claim 3, wherein:

the actuator, the holder component, and the elastic member are closer to one side from a center portion of the vibration target component when a vibration direction of the vibration target component is used as a reference.

5. A vibration generation device comprising:

a housing;

a vibration target component that is movable relative to the housing;

an actuator having a metal base portion, a metal movable portion, and a shape memory alloy in a belt shape and disposed between the base portion and the movable portion and wherein, when the shape memory alloy receives electrical current that reduces a size of an outer shape, the movable portion is pushed out in one direction of separation from the base portion when the base portion abuts a first wall surface of the housing;

a resin holder component fixed to the vibration target component and abutting a pushing surface facing the one direction of the movable portion;

an elastic member configured to elastically energize the movable portion in a direction opposite to the one direction;

the housing has a placement surface on which the vibration target component is placed in a movable state, and has an opening portion in a part of the placement surface, the holder component is fixed, through the opening portion, to an opposite surface to the placement surface of the vibration target component, and the holder component and the actuator are configured to be movable inside the opening portion.

6. The vibration generation device according to claim 5, wherein:

the housing has the first wall surface in a first edge portion of the opening portion and on which the base portion abuts, and has a second wall surface in a second edge portion facing the first edge portion of the opening portion and on which the elastic member abuts.

7. The vibration generation device according to claim 5, wherein:

the actuator, the holder component, and the elastic member are closer to one side from a center portion of the vibration target component when a vibration direction of the vibration target component is used as a reference.

* * * * *